United States Patent [19]

Just et al.

[11] Patent Number: 5,678,960
[45] Date of Patent: Oct. 21, 1997

[54] TWIST DRILL

[75] Inventors: Werner Just, Schwabach; Dieter Mühlfriedel, Ebermannstadt, both of Germany

[73] Assignee: Kennametal Hertel AG, Furth, Germany

[21] Appl. No.: 592,428

[22] PCT Filed: Aug. 2, 1994

[86] PCT No.: PCT/DE94/00895

§ 371 Date: Feb. 2, 1996

§ 102(e) Date: Feb. 2, 1996

[87] PCT Pub. No.: WO95/04624

PCT Pub. Date: Feb. 16, 1995

[30] Foreign Application Priority Data

Aug. 6, 1993 [DE] Germany ............... 9311715 U

[51] Int. Cl.⁶ ............................................. B23B 51/02
[52] U.S. Cl. ........................................ 408/230; 408/144
[58] Field of Search ........................... 408/230, 229, 408/144

[56] References Cited

U.S. PATENT DOCUMENTS

| | | | |
|---|---|---|---|
| 4,744,705 | 5/1988 | Imanaga | 408/230 |
| 5,350,261 | 9/1994 | Takaya et al. | 408/230 |

FOREIGN PATENT DOCUMENTS

| | | |
|---|---|---|
| 1106144 | 11/1956 | Germany . |
| DA 3927616 | 2/1991 | Germany . |
| 59-175912 | 10/1984 | Japan . |

*Primary Examiner*—Steven C. Bishop
*Attorney, Agent, or Firm*—John J. Prizzi

[57] ABSTRACT

The invention relates to a twist drill, especially for metals. It has a substantially cylindrical basic component (1) divided into a shaft (2) and a cutting section (3), the central longitudinal axis (5) of which is the axis of rotation of the twist drill. Several swarf grooves (4, 4') are made in the cylindrical surface of the basic component (1) which extend spirally and continuously from the shaft (2) to the drill tip (6) and bound a swarf chamber (35). The feature of the twist drill is that its drill core diameter tapers continuously from the drill tip (6) to the shaft (2).

19 Claims, 5 Drawing Sheets

TWIST DRILL

The invention relates to a twist drill, especially for processing metals. Such drills normally have a cylindrical basic component which is divided into a shaft and a cutting section. Several swarf grooves are made in the surface of the cutting section which extend spirally around the central longitudinal axis of the drill or the drill core and end in the o-face which forms the drill tip. Drills for a specified drilling depth that is greater than or equal to three times the drill diameter are referred to as long drills. In other words, the minimum drilling depth in long drills is three times the diameter of the drill.

A problem with long drills is that undesirable torsional vibrations may occur because of the ratio of drill length to drill diameter. A further problem is chip removal with increasing drilling depth. During drilling, the chip which is removed in the effective range of the drill tip or the drill's major cutting edges is rolled in the swarf groove between the face, which is the swarf groove surface, on the one hand, and the interior wall of the bore hole, on the other hand, and is given a roughly spiral form. As the boring process proceeds, this chip or fragments thereof are transported in the swarf groove in the direction of the shaft end of the drill. The chip thereby robs against both the face and the interior wall of the bore hole. This friction decreases the chip removal rate and can finally cause the chips to back up. Other chips being pushed along cause a further increase in the friction forces which in turn causes a substantial increase in the cutting forces and increases heat development. This results in disproportionate wear of the drill's major cutting edges. In the extreme case, a backing up of the chips can cause the drill to break.

Automatic drills are frequently linked to an electronic monitoring system. This type of electronic monitoring system would interpret a disproportionate increase in the cutting forces as an indication of very high drill wear or chipping of the cutting edge and would stop the drill. In fact, however, the drill edge would not show any wear at all. Instead, there would be a backup of chips which could not be relieved by simply switching off the machine. For to eliminate the chip backup, the drilling tool would need to continue to run without feed in order to remove the collected chip material from the bore hole through the swarf groove. Drilling could then resume normally.

A long drill known from DE-DA-39 27 615 solves the torsional vibration problem by expanding the drill core from the tip to the shaft. However, this impedes chip removal because the depth of the swarf groove decreases with increasing distance from the drill tip. To remedy this, the swarf grooves of the known drill were substantially widened. This is expressed in the ratio of back width or minor flank to groove width which is 0.8–0.9. However, this widened swarf groove can improve chip removal only to a limited extent because the depth of the swarf groove decreases with increasing distance from the drill tip. A round or spiral chip which is formed in the effective range of the major cutting edges of the drill and has a diameter corresponding to the swarf groove depth in the area of the drill tip would, with increasing distance from the drill tip, have increasing difficulty to fit into the swarf chamber bounded by the face and the interior wall of the bore hole. As a result, the chip would increasingly rub against the face and the interior wall of the bore hole and thus cause the chip removal rate to decrease.

Also known in prior art are twist drills the core diameter of which increases towards the shaft while their angle of twist decreases to improve chip removal in the same direction.

Based on the above, it is the object of the invention to make a twist drill in such a way as to avoid the backup of chips and to make it possible to operate the drill at high cutting rates over the entire drilling depth or cutting length without any significant torsional vibrations. To accomplish this, the invention takes an approach which is very different from that of prior art. In contrast to prior art, the drill core diameter according to the invention does not increase from the drill tip toward the shaft, instead it is tapered continuously at least along a portion of the cutting component that is adjacent to the drill tip. The taper of the core diameter necessarily implies that the depth of the swarf groove, that is, the radial clearance between the interior wall of the bore hole and the face area that touches the core diameter, increases. Although the increase in the swarf groove depth also implies an increase in the cross-sectional area or the volume of the swarf groove, it is not the increased area or volume which are crucial, but almost exclusively the increased swarf groove depth. The diameter of the chip which is removed in the effective range of the drill tip approximately corresponds to the depth of the swarf groove in the tip area of the drill. While the chip rubs against both the face and the interior wall of the bore hole in the tip area of the drill, it is transported almost exclusively by the face of the swarf groove and thus with less friction in that area of the bore hole which is remote from the tip. Since friction along the interior wall of the bore hole is now practically absent, the force required to transport the chip is reduced. The reduced resistance to the chip's transport prevents or decreases the braking action so that the chip removal rate remains constant practically along the entire cutting length of the twist drill, thereby effectively avoiding a backup of chips. Furthermore, reduced friction in the transport of the chip decreases friction-induced heat development on the face.

It was revealed that despite the taper of the core diameter in the direction of the shaft of the twist drill, no significant torsional vibrations occur. This can primarily be attributed to the reduced friction in chip removal and the almost constant cutting force over practically the entire drilling depth. Another advantage is that the connection of the drill to an electronic monitoring system will not result in interruptions of the drilling process which are due to increased cutting forces because of chip backup.

As previously mentioned, the increase of the cross-sectional area or the volume of the swarf groove is less crucial than the clearance between the interior wall of the bore hole and the face, that is, the swarf groove depth. Keeping constant the cross-sectional shape of the swarf groove or the curvature of the face, also as seen in cross-section, makes it possible repeatedly to grind the twist drill according to the invention. Particularly for high-quality drills, such as solid carbide drills, this is a decisive cost advantage. It is well known that regrinding a twist drill causes the drill or cutting length to be shortened due to the removal of material in the drill tip area. A widening of the swarf groove for the sole purpose of increasing its cross-sectional area would not allow repeated grinding of a twist drill, because widening the swarf groove in the corresponding areas which are remote from the tip causes completely different swarf groove profiles or face curvatures which are unsuitable for making or forming chips. By contrast, the drill according to one embodiment 2 of the invention has a swarf groove profile or curvature which remains substantially constant along the entire section that is usable for drilling, that is, along the cutting length of the drill's cutting component. As a result, after each grinding process, the shape of the face in the twist drill tip area is always such as to be suitable for making and forming chips. By nature, this can only be achieved if the core diameter of the twist drill according to the invention is not abruptly but continuously tapered. It is not necessary, however, that the continuous taper of the drill core diameter extend along the entire length of the cutting component. With frequently reground drills which retain only a portion of their original length it is in any case no longer possible to obtain the greater drilling depths. Since chip removal is less of a problem with decreased drilling depth, it may be appropriate to dispense with a further decrease in the drill core diameter in the area of the cutting component which is close to the shaft. In any case, with very long drills, stability considerations limit the extent to which the drill core diameter can be decreased.

The face area which primarily affects chip formation is that portion of the face which has the smallest radius of curvature. According to another embodiment of the invention, this radius of curvature, hereinafter referred to as chip forming radius, increases with increasing distance from the drill tip. Again, it is not the corresponding possible increase in the cross-sectional area of the swarf groove that is crucial, but rather the following effect: when the chip is formed, the chip forming radius determines the degree of curvature or diameter of the spiral-shaped chip. If the chip forming radius were to remain constant along the cutting length of the twist drill, the chip forming property of the face at a point which is remote from the tip would no longer be optimal. For chip formation not only depends on the face, but also on the interior wall of the bore hole and particularly on the ratio of the difference between drill diameter and drill core diameter and the chip forming radius. Since an increase in the distance from the drill tip implies an increase in swarf depth, i.e. the radial clearance between the face section which is crucial in chip formation and the interior wall of the bore hole and, respectively, the difference between the drill diameter and the drill core diameter, the aforementioned dimension ratio would, with a constant chip forming radius and increased distance from the drill tip, assume values that lie further outside the optimum value range. The chip forming properties of swarf groove areas that are remote from the tip, which would be the effective range of the drill after repeated grinding, would continue to deteriorate.

According to a further embodiment of the invention, the above stated dimension ratio assumes a value of 4.0 as its greatest value. This value is reached when the chip forming radius is half the swarf groove depth. According to the invention, the value of said dimension ratio can vary between 4.0 and 2.7. The value of 2.7 is reached when the chip forming radius is approximately ¾ of the swarf groove depth. Within the claimed value range, satisfactory chip formation and chip removal are ensured. It is advantageous to retain the selected dimension ratio along the cutting length or the length that may be reduced by grinding so that after each grinding process the same geometric conditions and therefore the same chip forming properties exist in the effective range of the drill tip. It is also feasible, however, that said ratio taper with increasing distance from the drill tip. However, the taper should not exceed a maximum of 40% of the original value at the drill tip.

The core diameter of a twist drill according to the invention is selected in such a way that it lies within a range of 0.22 D–0.35 D, where D is the diameter of the drill or the cutting component. The value 0.22 D is the minimum value for the drill core diameter. A thinner drill core would risk breakage of the drill. On the other hand, the value 0.35 D represents the lower limit of the swarf groove depth. A thicker drill core would make the swarf groove depth too shallow to ensure low-friction chip removal according to the invention. The taper of the core diameter with increasing distance from the drill tip should preferably be 0.2 mm–0.8 mm per 100 mm drill length. The twist drill according to the invention is preferably a solid carbide drill.

Thus, the design of the swarf groove according to the invention makes it possible to regrind the twist drill within a very wide range. It is even possible that a frequently reground twist drill which has become too short to drill deep bore holes can continue to be used for shallower boring depths. The continuous increase in the swarf groove depth and retention of the swarf groove cross-sectional shape over almost the entire cutting length makes it possible to continue to use the twist drill according to the invention even if it has been considerably shortened compared to its manufacturing length.

In addition, the twist drill design according to the invention results in a reduction of the cutting forces. This reduction in the cutting forces has the direct effect of reducing stress on the cutting material itself. In turn, these factors increase the life of the tool considerably. Tests have shown that tool life can be doubled or tripled with a drill according to the invention. The improvement in economic efficiency and productivity that is connected with prolonged tool life is self-evident.

An embodiment of the twist drill according to the invention is described below and the attached drawings are used to illustrate additional advantages of the drill according to the invention.

Figure 1:
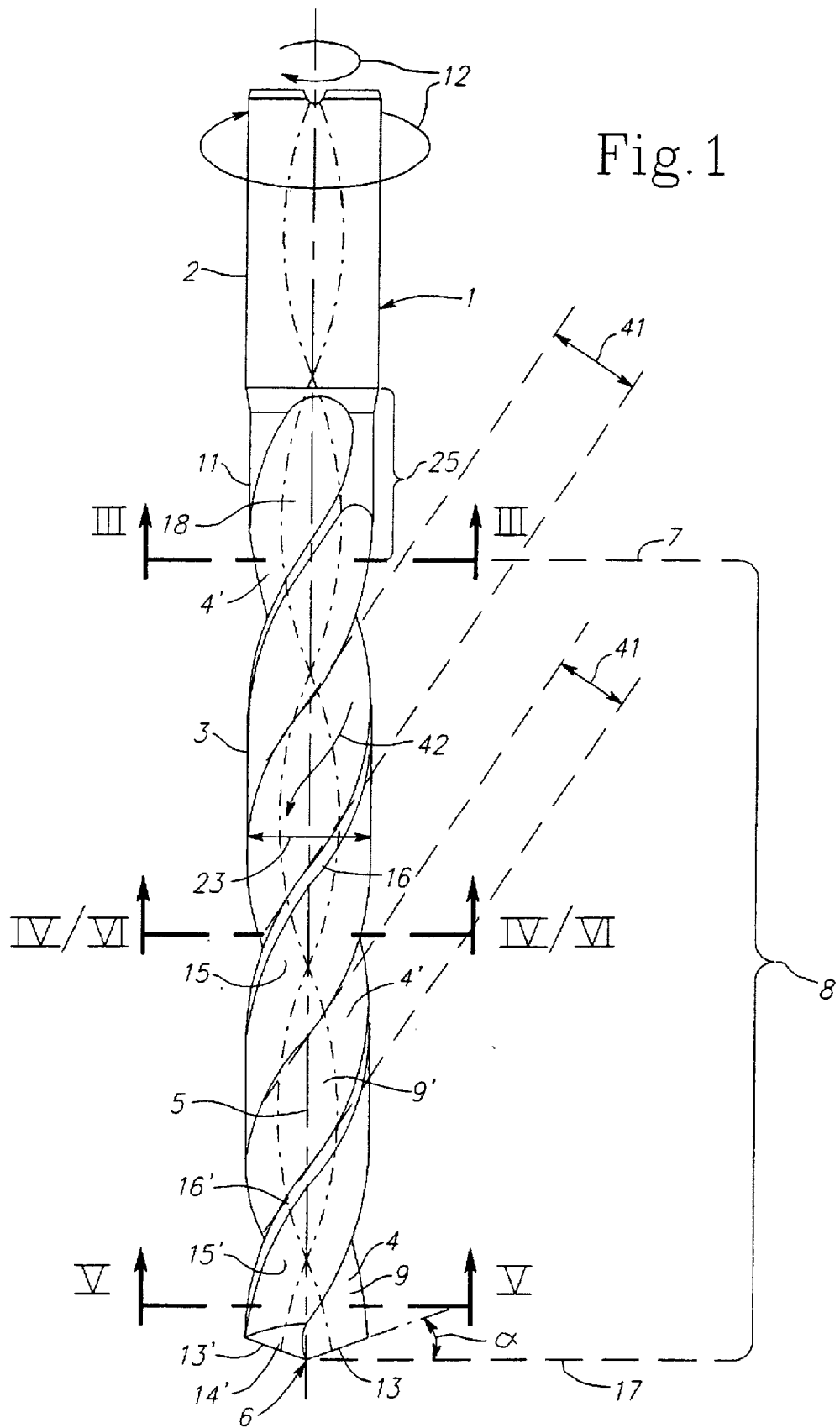
FIG. 1 shows a side elevation of the twist drill according to the invention.

FIG. 1 shows a twist drill (hereinafter simply referred to as drill) having a substantially cylindrical basic component 1 which is divided into a shaft 2 and a cutting component 3. Two diametrically opposed swarf grooves 4, 4' are made in the surface of the cutting component 3. The swarf grooves extend spirally around the central longitudinal axis 5 of the drill and open onto the end face of the drill which forms the drill tip 6. The cutting component 3 can be divided into two sections, one usable section which extends from the drill tip 6 to the extension line 7 and which is the cutting length 8 of the cutting component 3. Between the section that defines the cutting length 8 and the shaft 2, there is an intermediate section where the swarf grooves 4, 4' level off and end in the surface of the cutting component 3. This intermediate section forms the runout 11 of the cutting component 3. The drill's central longitudinal axis 5 is also its rotational axis around which it turns in the direction of the arrow 12 when it is in operation.

For the rest, the drill according to FIG. 1 has the usual features of a twist drill, such as two major cutting edges 13, 13', two major flanks 14, 14', and two minor flanks 15, 15', each having a margin 16, 16'. The major cutting edges 13, 13' together with an assumed working plane 17 form the side clearance angle α. The angle of twist of the swarf grooves 4, 4' is preferably constant along the entire cutting length.

Figure 2:
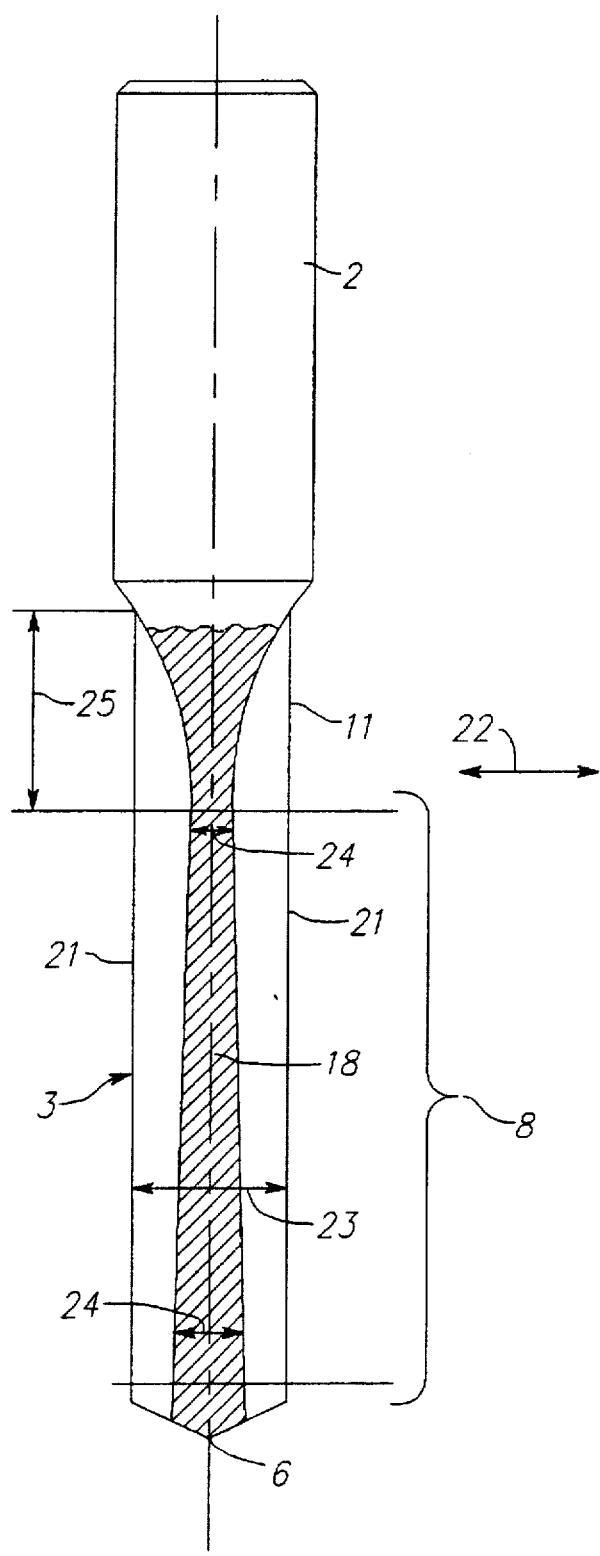
FIG. 2 shows a schematic side elevation of the drill according to FIG. 1 with a schematic representation of the open drill core.

FIG. 2 shows the cutting component 3 and a cross section through the drill core 18. The extension lines 21 which flank the drill core 18 mark the extension of the cutting component 3 in transverse direction 22. They represent the longitudinal section lines of an imaginary envelope having a diameter which corresponds to the diameter 23 of the cutting section 3. As FIG. 2 clearly shows, the drill core 18 continuously tapers from the drill tip 6 towards the shaft 2. The drill core diameter 24 is therefore greater in the area of the cutting component 3 near the tip than in the area close to the shaft. The taper of the drill core is selected such that the decrease in the drill core diameter 24 over a length of 100 mm is 0.2–0.8 mm. The length of the runout 11 of the drill is 1.5 times the drill diameter 23.

Figure 3:
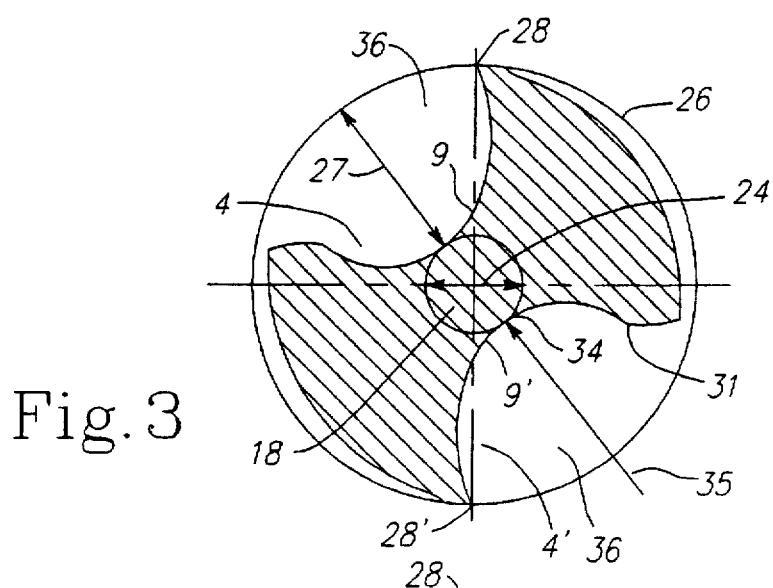
FIG. 3 shows a section based on Line III—III in FIG. 1.
Figure 4:
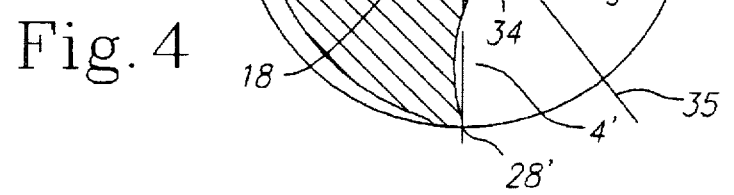
FIG. 4 shows a section based on Line IV—IV in FIG. 1.
Figure 5:
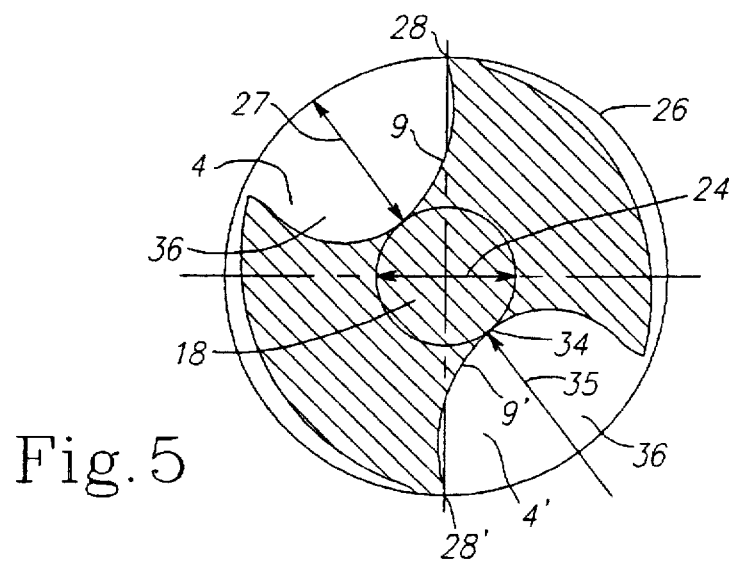
FIG. 5 shows a section along Line V—V in FIG. 1.

In the cross-sectional representations of FIGS. 3 through 5, the circular line which defines the cross section of the cutting component is the envelope line 26 of the cylindrical surface of the cutting component 3. As FIGS. 3 through 5 clearly show, the drill core diameter 24 tapers from FIG. 5, which shows a section through the tip area of the drill (Line V—V in FIG. 1), to FIG. 3, which shows a section through the area near the shaft of the cutting component 3 (Line III—III in FIG. 1). This decrease is connected with an increase in the swarf groove depth 27. To promote clarity, the swarf groove depth 27 is indicated only for the one swarf groove 4 of the two swarf grooves 4, 4'. FIGS. 3 through 5 and FIG. 6 show the curvature of the face 9, 9'. The face extends inward, in convex and substantially radial manner, from the front edge of the margin 16, 16' which forms the minor cutting edge 28, 28' to the central longitudinal axis 5 and touches the drill core in the center of the cutting component 3. From there it extends outward again, with approximately the same curvature and in radial manner, and changes its curvature direction at a curvature reversal point 31. By nature, the area of the face 9, 9' which extends radially outward from the curvature reversal point 31 has practically no influence on the shaping of a chip removed by the tool. This area is usually referred to as the back chamfer and is production engineering dependent.

Figure 6:
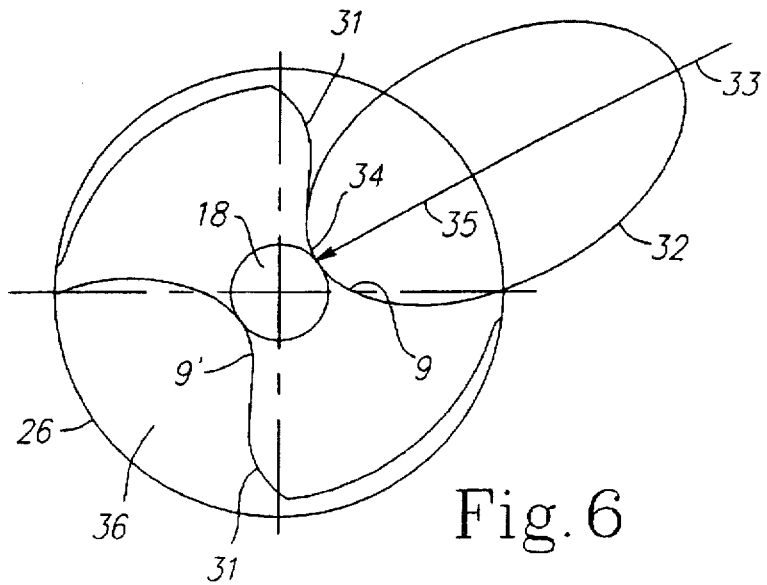
FIG. 6 shows a section along Line VI—VI in FIG. 1.

The curvature of the face 9, 9' as seen in cross-section can be viewed approximately as an arc section of an ellipse 32 (FIG. 6). The longitudinal axis 33 of the ellipse 32 is thereby approximately radially oriented to the drill's central longitudinal axis 5. However, it is also feasible that the curvature of the flank 9,9' more closely resembles a circular arc.

FIGS. 3 through 5 furthermore show that the main chip forming area 34, which is adjacent to the drill core 18 and primarily defines the formation and especially the curvature radius of the chip, has a curvature radius, hereinafter referred to as chip forming radius 35, which increases from FIG. 5 to FIG. 3. Thus, the radius of the face 9,9' which defines chip formation is the chip forming radius 35. The chip forming radius 35 decreases with increasing distance from the drill tip 6. In other words, the curvature of the main chip forming area 34 flattens out visibly.

Figure 7:
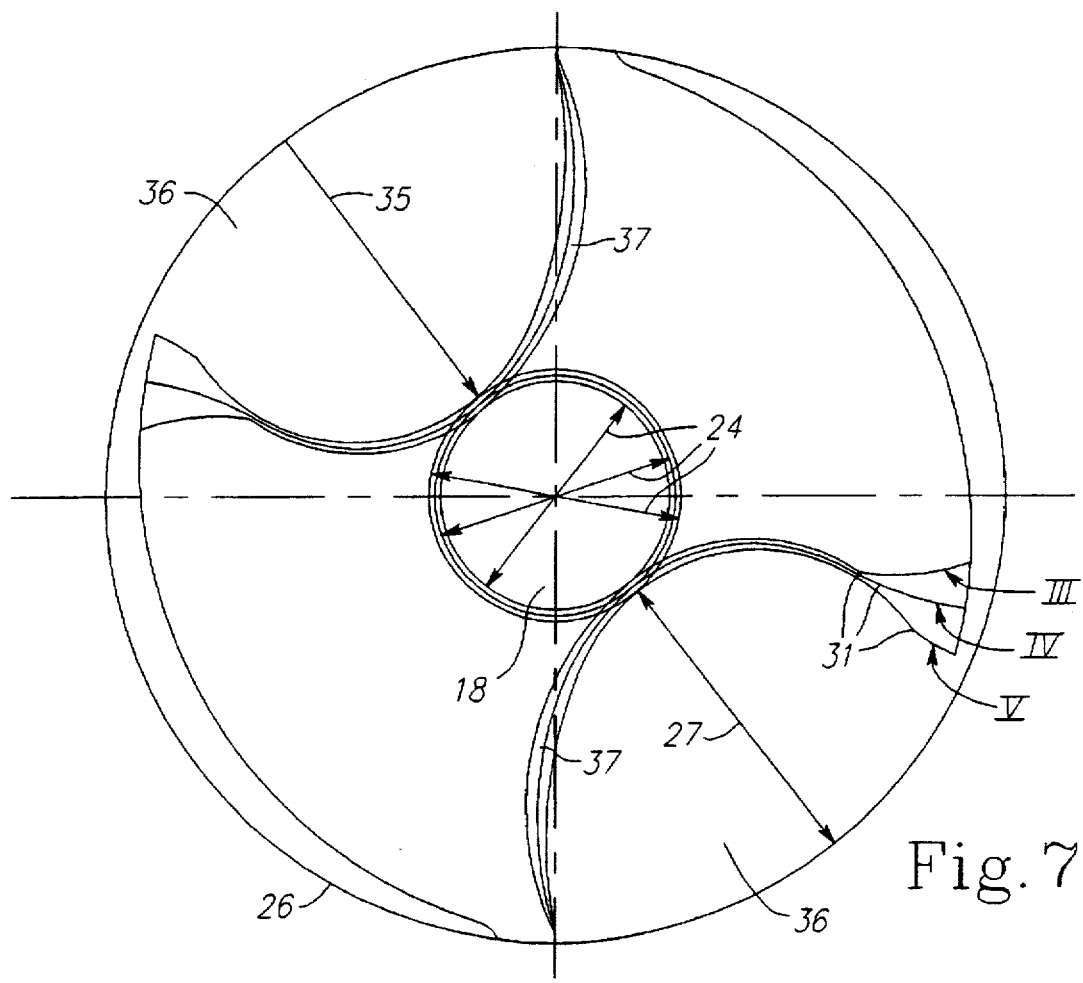
FIG. 7 is a representation in which the sections according to FIGS. 3 through 5 are magnified and congruently superposed one on top of the other.

FIG. 7 shows the magnified cross sections of FIGS. 3 through 5 congruently superposed one on top of the other. The individual curves are identified as III, IV, and V according to the section lines in FIG. 1. This representation again clearly shows the taper of the drill core diameter 24. It also shows that in addition to the increase in the swarf groove depth 27 and the resulting increase in the cross-sectional area of the swarf chamber 36, there is an additional increase in the swarf chamber 36. It is due to the fact that the face area which is adjacent to the margin 16,16' curves increasingly inward with increasing distance from the drill tip 6. The increase in the resulting cross-sectional area 37 corresponds to the area segment which is bounded by the cross-sectional lines III and V, is approximately sickle-shaped, and extends from the margin 16,16' to approximately the drill core 18. However, this area increase is of minor significance in the twist drill according to the invention, as will be explained in more detail below. Finally, FIG. 7 shows how the shape of the back chamfer, that is, the face area which extends radially outward from the curvature reversal point 31, changes with increasing distance from the drill tip. This change is substantially production-engineering dependent and does not crucially affect chip removal or the chip-forming behavior of the present drill. However, such widening facilitates the supply of cooling liquid. Due to the change in the shape of the back chamfer with increasing distance from the drill tip 6, there is an increasing widening of the swarf groove 4,4'. This widening is also evident in FIG. 1 which depicts the swarf groove width 41 measured at an angle to the spiral direction 42 of the swarf groove 4,4'. The swarf groove width 41 increases in the direction of the shaft 2 such that the swarf grooves 4 and 4' which are adjacent in the plan view of FIG. 1 differ in their swarf groove width 41. The swarf groove area closer to the shaft has a greater swarf groove width 41.

Figure 8:
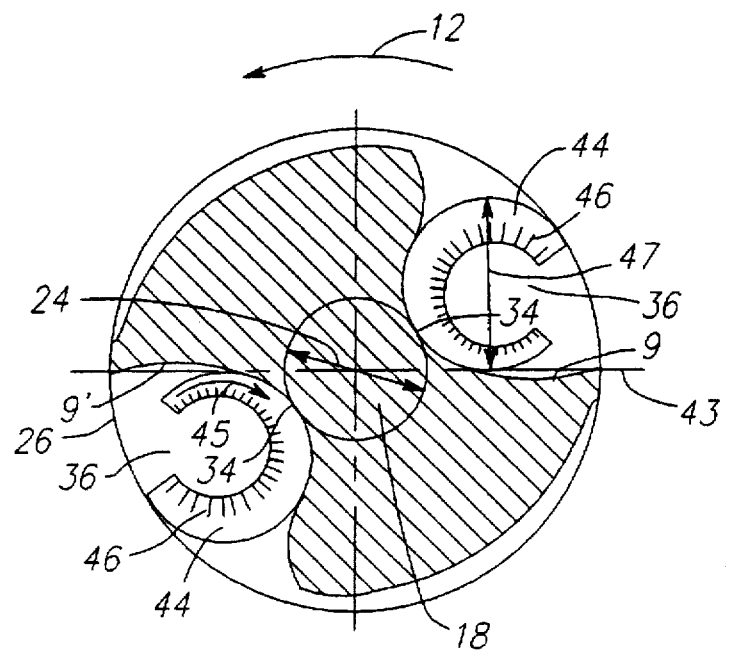
FIG. 8 shows a section according to FIG. 4 but includes a schematically drawn chip.
Figure 9:
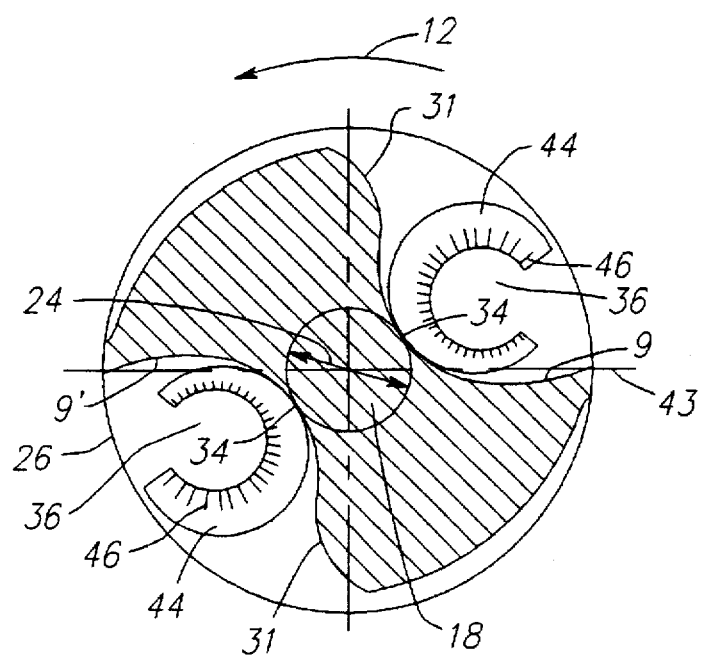
FIG. 9 shows a section according to FIG. 5, also including the chip inside the swarf groove.

FIGS. 8 and 9 are used to illustrate the operation of the drill according to the invention: FIG. 8 schematically shows chip formation in the effective range of the drill tip 6, that is, in an area approximately coinciding with the section line V—V of FIG. 1. As the drill turns in the direction of arrow 12, a chip 44 is removed by the major cutting edges 13, 13' which in FIG. 8 run approximately in the direction of the center line 43. With continued rotation of the drill, this chip moves along the face 9, 9' in the direction of arrow 12 and, due to the curvature of the face 9, 9', is deflected in the direction of arrow 45 and spirally deformed. The area of the face 9, 9' which defines the outer curve of the chip 44 is the main chip forming area 34 which adjoins the drill core 18. This area has the smallest curvature radius of the entire face 9, 9', namely the chip forming radius 35, and therefore deflects the chip 44 most strongly. The interior circumference of the chip 44 is compressed as is indicated by the compression lines 46 in FIGS. 8 and 9. After the chip 44 reaches a certain length, it frequently breaks, preferably along the compression lines 46. With advancing drilling depth, the chip is transported from the effective point of the drill, which is its tip area, in the direction of the drill's shaft 2. In these areas of the swarf groove 9,9' or the swarf chamber 36 which are remote from the tip, the drill core diameter 24 is smaller and the swarf depth 27 correspondingly greater. Due to the curvature of the main chip forming area 34 which is present in the tip area according to FIG. 8, the chip 44 receives a corresponding curvature and thereby a chip diameter 47 which approximately corresponds to such curvature. With increasing distance from the drill tip 6, the difference between the swarf groove depth 27 and the chip diameter 47 noticeably increases. As a result, the chip or chip fragments in the areas remote from the tip no longer lie or rub against the interior wall of the bore hole which approximately corresponds to envelope line 26 in FIGS. 8 and 9. The guiding surface instead is only the face area which remains in contact with the outside circumference of the chip 44. In the swarf groove areas which are remote from the tip, the chip 44 is therefore guided practically only by said face areas which are in contact with the outside circumference of the chip 44 (see FIG. 9). As a result, the resistance to chip removal decreases as the distance from the point where the chip is formed increases. This effectively prevents a chip backup and the well-known concurrent phenomena which are an increase in the cutting force and in the temperature of both the workpiece and the drill.

A drill according to the invention can be repeatedly ground because the cross-sectional shape of the swarf groove 4, 4' or the swarf chamber 36 corresponds to the original tip area along almost the entire cutting length 8. For example, grinding the drill to a residual length corresponding to Line IV—IV of FIG. 1, results in a cross-sectional shape that approximately corresponds to that depicted in FIG. 9. In this case, however, the formed chip 44 would also be in contact with the wall of the bore hole (zero line 26) as depicted in FIG. 8. For the chip forming radius 35 which defines the shape properties of the main chip forming area 34 increases in the direction of the shaft 2 so that the developing chip 44 has a correspondingly greater outer curvature and thereby a correspondingly greater chip diameter 47. This diameter 47 would then approximately correspond to swarf groove 27 in FIG. 9.

The difference of the drill diameter 23 (D) and the drill core diameter 24 is twice the depth of the swarf groove 27. The swarf groove therefore is $D-D_K/2$. In order for a chip 44 to fit into a swarf chamber 36 having a predetermined swarf groove depth 27, the chip forming radius 35 must be approximately half of the swarf groove depth or $D-D_K/4$. Smaller chip-forming radii 35 ($R_F$) are undesirable because they no longer ensure the combined action of the interior wall of the bore hole and of the face 9,9'. However, $R_F$ can assume greater values. The upper limit determined for a chip forming radius $R_F$ max. is $D-D_K/2.7$.

Testing was conducted to show the dependence of the cutting force and the torque of a twist drill as a function of the drilling depth. The test conditions for a drill according to prior art (Tool 1) and the invention (Tool 2) are shown below. It is found that for the prior art tool that there is a gradual increase in the cutting force and the correlated torque starting with a drilling depth of approximately 40 mm and an abrupt increase at a drilling depth of approximately 45 mm.

It is found that both the cutting force and the torque are clearly below the comparison values of prior art tool 1 and that there is no increase of these parameters at greater drilling depths. The result is a constant cutting force and a constant torque across practically the entire cutting length or drilling depth.

The following table lists the test conditions and the various materials used.

| | |
|---|---|
| Workpiece: | Wheel support for an automobile |
| Material 45 M5 UA2[1] | Hardness: 269HB[2] |
| Bore hole diameter 11 mm | Drilling depth: 55 mm |
| Machine: | Machining center with coolant supply by means of a spindle, coolant pressure 18 bar |
| Cutting data: | |
| Rotational speed: | 2315 l/min |
| Cutting speed: | 80 m/min |
| Feed rate: | 695 mm/min |
| Feed rate per revolution: | 0.3 mm |
| Tool 1: | Solid carbide drill with cooling duct having 4 margins and a conventional swarf groove geometry, that is, constant core diameter and constant swarf groove profile from drill tip to swarf groove runout. |

-continued

| | |
|---|---|
| Cuttin, material: | PVD[3] coated carbide metal for P40 application |
| Drill tip sharpening according to EP0249104A1 | |
| Core diameter: | 3.2 mm |
| Chip forming radius: | 2.7 mm |
| Ratio (D–Dk)/Rs: | 2.9 |

[1] French material standard AVNOR
[2] Brinell hardness
[3] Plasma vapor deposition

| | |
|---|---|
| Tool 2: | Solid carbide drill with cooling duct having 4 phases and a swarf groove geometry according to the invention |
| Cutting material: | PVD[3] coated carbide metal for P40 application |
| Drill tip sharpening according to EP0249104A1 | |
| Core diameter at drill tip: | 3.2 mm |
| Core diameter at swarf chamber runout: | 3.0 mm |
| Chip forming radius at drill tip: | 2.0 mm |
| Chip forming radius at swarf chamber runout: | 2.5 mm |
| Ratio (D–Dk)/Rs at drill tip: | 3.9 |
| Ratio (D–Dk)/Rs at swarf chamber runout: | 3.2 |

We claim:

1. A twist drill, especially for metals, having
   a substantially cylindrical basic component (1) which is divided into a shaft (2) and a cutting component (3), the central axis (5) of which is the rotational axis of the twist drill, and
   several swarf grooves 4, 4' which are made in the cylindrical surface of the cutting component (3) and extend spirally and continuously from the shaft (2) to the drill tip (6) and form a swarf chamber (36),
   characterized by the fact
   that the drill core diameter of the twist drill continuously tapers from the drill tip (6) to the shaft (2) at least in a partial section which is adjacent to the drill tip,
   that at least a partial section extending from the drill tip (6) towards the shaft (2) of the section of the cutting component (3) which is usable for drilling and defines the cutting length (8) of the drill has a substantially constant cross-sectional shape of the swarf groove 4, 4' and, respectively, a curvature of the face 9, 9' which forms the interior wall of the swarf groove,
   such that a main chip forming area (34) of the face 9, 9' which defines chip formation has a chip forming radius (35) which increases with increasing distance from the drill tip (6).

2. The twist drill according to claim 1 further characterized by the fact that the ratio $(D-D_K):R_S$ has a value between 2.7 and 4.0, where D is the drill diameter (23), $D_K$ the drill core diameter (24), and $R_S$ the chip forming radius.

3. The twist drill according to claim 2 further characterized by the fact that the ratio $(D-D_K):R_S$ is constant at least along a section of the cutting length 8.

4. The twist drill according to claim 2 further characterized by the fact that the ratio $(D-D_K):R_S$ decreases along the cutting length (8) by a maximum of 40% with respect to the value in the area of the drill tip (6).

5. The twist drill according to claim 1 further characterized by the fact that the drill core diameter (24) lies in the range of 0.22 D to 0.35 D.

6. The twist drill according to claim 1 further characterized by the fact that the taper of the drill core diameter (24) is 0.2 mm to 0.8 mm per 100 mm of drill length.

7. The twist drill according to claim 1 further characterized by the fact that it is a solid carbide drill.

8. The twist drill according to claim 2 further characterized by the fact that the drill core diameter (24) lies in the range of 0.22 D to 0.35 D.

9. The twist drill according to claim 3 further characterized by the fact that the drill core diameter (24) lies in the range of 0.22 D to 0.35 D.

10. The twist drill according to claim 4 further characterized by the fact that the drill core diameter (24) lies in the range of 0.22 D to 0.35 D.

11. The twist drill according to claim 2 further characterized by the fact that the taper of the drill core diameter (24) is 0.2 mm to 0.8 mm per 100 mm of drill length.

12. The twist drill according to claim 3 further characterized by the fact that the taper of the drill core diameter (24) is 0.2 mm to 0.8 mm per 100 mm of drill length.

13. The twist drill according to claim 4 further characterized by the fact that the taper of the drill core diameter (24) is 0.2 mm to 0.8 mm per 100 mm of drill length.

14. The twist drill according to claim 5 further characterized by the fact that the taper of the drill core diameter (24) is 0.2 mm to 0.8 mm per 100 mm of drill length.

15. The twist drill according to claim 2 further characterized by the fact that it is a solid carbide drill.

16. The twist drill according to claim 3 further characterized by the fact that it is a solid carbide drill.

17. The twist drill according to claim 4 further characterized by the fact that it is a solid carbide drill.

18. The twist drill according to claim 5 further characterized by the fact that it is a solid carbide drill.

19. The twist drill according to claim 6 further characterized by the fact that it is a solid carbide drill.

* * * * *